(12) United States Patent
Seung

(10) Patent No.: US 8,697,768 B2
(45) Date of Patent: Apr. 15, 2014

(54) ENERGY CURABLE OVERPRINT VARNISH AND COATED PRODUCT

(75) Inventor: Norman Seung, Mason, OH (US)

(73) Assignee: Michelman, Inc., Cincinnati, OH (US)

( * ) Notice: Subject to any disclaimer, the term of this patent is extended or adjusted under 35 U.S.C. 154(b) by 209 days.

(21) Appl. No.: 13/240,441

(22) Filed: Sep. 22, 2011

(65) Prior Publication Data

US 2012/0067759 A1    Mar. 22, 2012

Related U.S. Application Data

(60) Provisional application No. 61/385,269, filed on Sep. 22, 2010.

(51) Int. Cl.
| | | |
|---|---|---|
| *C07D 303/40* | (2006.01) | |
| *B65D 85/00* | (2006.01) | |
| *C08G 59/50* | (2006.01) | |
| *C08F 2/46* | (2006.01) | |

(52) U.S. Cl.
USPC ........ 522/170; 206/459.5; 523/400; 427/496; 427/508; D07/601

(58) Field of Classification Search
USPC ........ 522/170; 206/459.5; 523/400; 427/496; 427/508; D07/601
See application file for complete search history.

(56) References Cited

U.S. PATENT DOCUMENTS

| | | | |
|---|---|---|---|
| 4,762,887 A * | 8/1988 | Griswold et al. | ............... 522/99 |
| 6,746,736 B2 | 6/2004 | Leeper et al. | |
| 6,803,112 B1 | 10/2004 | Chatterjee et al. | |
| 6,893,686 B2 | 5/2005 | Egan | |
| 6,900,252 B2 | 5/2005 | Khudyakov et al. | |
| 7,063,882 B2 | 6/2006 | Mossbrook et al. | |
| 7,166,647 B2 | 1/2007 | Herlihy et al. | |
| 7,214,725 B2 | 5/2007 | Narayan-Sarathy et al. | |
| 7,252,709 B2 | 8/2007 | Narayan-Sarathy et al. | |
| 7,291,658 B2 | 11/2007 | Narayan-Sarathy et al. | |
| 7,317,061 B2 | 1/2008 | Narayan-Sarathy et al. | |
| 7,396,861 B2 | 7/2008 | Loccufier et al. | |
| 2002/0121631 A1 | 9/2002 | Rahman et al. | |
| 2004/0127596 A1 | 7/2004 | Biro et al. | |
| 2008/0039543 A1 | 2/2008 | Narayan-Sarathy et al. | |
| 2008/0085981 A1 | 4/2008 | Narayan-Sarathy et al. | |
| 2008/0102271 A1 | 5/2008 | Bilodeau | |

OTHER PUBLICATIONS

Food and Drug Administration, Inventory of Effective Foor Contact Substance (FCS) Notifications, No. 772, Mar. 8, 2008.

* cited by examiner

*Primary Examiner* — Michael Pepitone
*Assistant Examiner* — Jessica Roswell
(74) *Attorney, Agent, or Firm* — Dinsmore & Shohl LLP

(57) ABSTRACT

An energy curable coating composition is provided for use as an overprint varnish on cellulosic, polymeric and metal substrates. The coating composition includes an epoxy acrylate, a triacrylate, and optionally, a diacrylate. The coating composition is applied to a substrate and cured by radiation to form a thermoformable protective coating. The coated substrate may then be thermoformed into a shaped food package or article.

16 Claims, 2 Drawing Sheets

ENERGY CURABLE OVERPRINT VARNISH AND COATED PRODUCT

CROSS REFERENCE TO RELATED APPLICATIONS

This application claims the benefit of U.S. Patent Application Ser. No. 61/385,269, entitled ENERGY CURABLE OVERPRINT VARNISH AND COATED PRODUCT filed Sep. 22, 2010. The entire contents of said application is hereby incorporated by reference.

BACKGROUND OF THE INVENTION

The present invention relates to a radiation curable coating for use as an overprint varnish for substrates, and more particularly, to a coating composition which can be applied to cellulosic, polymeric, and metallized substrates, and cured to form a protective film which is thermoformable.

The use of energy curable varnishes and coatings for use on food or beverage containers and various substrates used for food packaging and dinnerware such as plates, bowls, cups, etc. is desirable in order to provide the substrates with properties such as grease and water resistance, gloss, and food release properties. Often, such coatings are provided as an overprint varnish applied to the outer surface of the packaging or substrate and over any graphics printed on the packaging or substrate.

Typically, such coatings comprise radiation-curable acrylate resins. However, polymerization of acrylates by ultraviolet radiation typically requires the addition of a photoinitiator. As traditional ketone-type photoinitiators are capable of producing hazardous products upon irradiation, the U.S. Food and Drug Administration has prohibited the use of most photoinitiators in food packaging applications where the coatings are in direct contact with food. Even in applications where the coatings do not directly contact the packaged food product, there is still a concern that one or more components of the coating may migrate through the packaging film/substrate to contact the packaged food. Thus, the use of energy-curable coating compositions for food packaging applications has been limited.

More recently, the United States Food and Drug Administration has cleared for use in food contact applications a mixture of one or more of tripropylene glycol diacrylate (TPGDA), trimethylolpropane triacrylate (TMPTA), trimethylolpropane ethoxylate triacrylate (TMPEOTA) and bisphenol A diglycidyl ether diacrylate, and an optional difunctional alpha-hydroxy ketone photoinitiator, cured by either ultraviolet or electron beam radiation, for use in food contact applications. See Food Contact Notification (FCN 772, Mar. 7, 2008).

Radiation-curable resins are also known in the art which include a "built-in" photoinitiator such that problems with odor which occur with the use of photoinitiators are eliminated. See, for example, US 2008/0039543, US 2008/0085981, and U.S. Pat. No. 7,317,061.

Even with these improvements, it has been difficult to develop energy curable coatings suitable for use on thermoformable food-carrying or food-containing substrates, i.e., substrates formed by heating the substrate to a temperature where it can be molded to a desired shape, such as cellulosic or polymeric plates, cups, bowls, containers, and the like. For example, pre-cured urethane acrylates, which are typically used in overprint varnishes and coatings, have high molecular weights and high viscosities which render them unsuitable for use as thermoformable coatings. While monomers can be added to lower the viscosity of such coatings during application, their flexibility is consequently reduced when cured due to increased cross-link density, which in turn, prevents or adversely affects the thermoformability of the coatings.

It would be desirable to be able to provide an energy curable composition for coating on substrates and packaging which provides desired food release, gloss, and grease and water resistance properties. It would also be desirable for such a coating to be thermoformable after curing.

Accordingly, there is a need in the art for an energy curable composition which can be applied to substrates and cured to form a protective film or coating which can be subjected to thermoforming when the substrates are subsequently heated and shaped into food packaging, containers, or dinnerware.

SUMMARY OF THE INVENTION

Embodiments of the invention meet those needs by providing an energy curable composition which can be applied to polymeric, cellulosic, or metallized substrates and cured to form a protective layer on the substrates. The substrates having the coating thereon may then be thermoformed into food packaging or food service containers such as plates, bowls, cups, trays, and the like. The coating exhibits superior food release properties, as well as grease and water barrier properties, and is thermoformable. By "thermoformable," I mean that the coating and coated substrate can be heated to a pliable forming temperature and then formed into a specific shape to create a useable product without compromising the functional properties of the coating. In addition, the coating does not transfer or adhere to the thermoforming press equipment used to form the desired shaped product.

According to one aspect of the invention, an energy curable coating composition for use on polymeric, cellulosic, or metal substrates is provided comprising a mixture of a) from about 20 to about 95% by weight of at least one epoxy acrylate selected from (i) a self-photoinitiating epoxy acrylate or (ii) an epoxy acrylate comprising about 85% by weight epoxy acrylate and about 15% by weight trimethylolpropane triacrylate; b) from about 0 to about 50% by weight of a diacrylate selected from dipropylene glycol diacrylate (DPGDA), tripropylene glycol diacrylate, neopentyl glycol diacrylate (NPGDA), silicone diacrylate, epoxy diacrylate, and combinations thereof; and c) from about 1 to about 55% by weight of a triacrylate selected from trimethylolpropane triacrylate, trimethylolpropane ethoxy triacrylate, and combinations thereof, the components being selected within the above ranges to provide 100% of the coating. After application to a substrate and upon curing, the coating is thermoformable and exhibits food release as well as water and grease barrier properties.

In one embodiment, the energy curable coating composition further comprises a photoinitiator.

The coating composition preferably has a room temperature viscosity of from about 50 to about 3,000 cps. The coating composition is preferably a 100% solids composition containing no solvents. By "100% solids," I mean that the composition uses no solvent or other carriers for the monomeric or oligomeric components. The coating may be cured by ultraviolet or electron beam radiation.

In another embodiment, the energy curable coating composition comprises from about 40 to about 95% by weight of at least one self-photoinitiating epoxy acrylate; from 0 to about 30% by weight of a diacrylate selected from dipropylene glycol diacrylate, neopentyl glycol diacrylate, silicone diacrylate, or a combination thereof; and from about 1 to about 30% of a triacrylate selected from trimethylolpropane ethoxy triacrylate, trimethylolpropane triacrylate, or a combination thereof, the components being selected within the above ranges to provide 100% of the coating. In one embodiment, the coating composition comprises from about 1 to 30% by weight of the diacrylate.

In another embodiment, the coating composition preferably further comprises from about 1 to about 5% by weight lauryl acrylate.

In one embodiment, the coating composition comprises at least two self-photoinitiating epoxy acrylates. Preferably, the two self-photoinitiating epoxy acrylates have differing viscosities.

In another embodiment of the invention, the energy curable coating composition comprises from about 20 to about 40% by weight of an epoxy acrylate comprising 85% by weight epoxy acrylate and about 15% by weight trimethylolpropane triacrylate; from 0 to about 50% by weight tripropylene glycol diacrylate; from about 1 to about 30% by weight trimethylolpropane triacrylate, and from about 15 to about 55% by weight trimethylolpropane ethoxy triacrylate, with the components being selected to provide 100% of the coating. This composition is suitable for direct food contact applications.

In one embodiment, the energy curable coating composition comprises from about 1 to about 40% by weight of said tripropylene glycol diacrylate.

The composition may further comprise from about 3 to about 10% by weight of a photoinitiator. The photoinitiator preferably comprises a difunctional alpha-hydroxy ketone.

In another embodiment of the invention, a method of forming a food package or article having an energy curable coating composition thereon is provided which comprises providing a substrate having first and second major surfaces; and applying an energy curable coating composition to at least one of the first and second major surfaces; where the coating comprises a) from about 20% to about 95% by weight of at least one epoxy acrylate selected from (i) a self-photoinitiating epoxy acrylate or (ii) a mixture of about 85% by weight of an epoxy acrylate and about 15% by weight trimethylolpropane triacrylate; b) from 0 to about 50% of a diacrylate selected from dipropylene glycol diacrylate, neopentyl glycol diacrylate, tripropylene glycol diacrylate, silicone diacrylate, epoxy diacrylate, and combinations thereof; and c) from about 1% to about 55% by weight of a triacrylate selected from trimethylolpropane triacrylate, trimethylolpropane ethoxy triacrylate, and combinations thereof.

The coating composition is then exposed to radiation sufficient to cure the coating composition and form a coated substrate; and the coated substrate is thermoformed into a shaped food package or article which exhibits food release and/or barrier properties. In one embodiment, the radiation comprises UV or electron beam radiation.

The coating composition may be applied as a 100% solids coating, and may be applied at a coat weight of about 0.1 to about 2.0 lbs/1000 ft$^2$ (0.49 to about 9.76 g/m$^2$). The coating composition is preferably applied by screen printing, gravure, offset gravure, flexographic, or rod coating. The coating is then preferably cured using UV or electron beam radiation.

In another embodiment, a coated and thermoformed package or article is provided comprising a substrate having first and second major surfaces, with at least one of the major surfaces having coated thereon a cured coating comprising a) from about 20% to about 95% by weight of at least one epoxy acrylate selected from (i) a self-photoinitiating epoxy acrylate or (ii) an epoxy acrylate comprising about 85% by weight epoxy acrylate and 15% by weight trimethylolpropane triacrylate; b) from 0 to 50% by weight of a diacrylate selected from dipropylene glycol diacrylate, neopentyl glycol diacrylate, tripropylene glycol diacrylate, silicone diacrylate, epoxy diacrylate, and combinations thereof; and c) from about 1 to about 55% by weight a triacrylate selected from trimethylolpropane triacrylate, trimethylolpropane ethoxy triacrylate, and combinations thereof. In one embodiment, the cured coating has a coat weight of about 0.1 to about 2.0 lbs/1000 ft$^2$.

The coated substrate may include printed indicia on the substrate and underlying the coating.

The coated package or article may comprise a cellulosic, polymeric, or metallized substrate. The cellulosic substrate may comprise paper, coated paper board, uncoated paper board or molded pulp. The polymeric substrate may comprise polypropylene, polyethylene, polyethylene terephthalate, and polylactic acid.

Accordingly, it is a feature of the present invention to provide an energy curable coating for use on substrates which is thermoformable upon curing and which exhibits food release and/or barrier properties. Other features and advantages of the invention will be apparent from the following description, the accompanying drawings, and the appended claims.

DETAILED DESCRIPTION OF THE PREFERRED EMBODIMENTS

Figure 1:
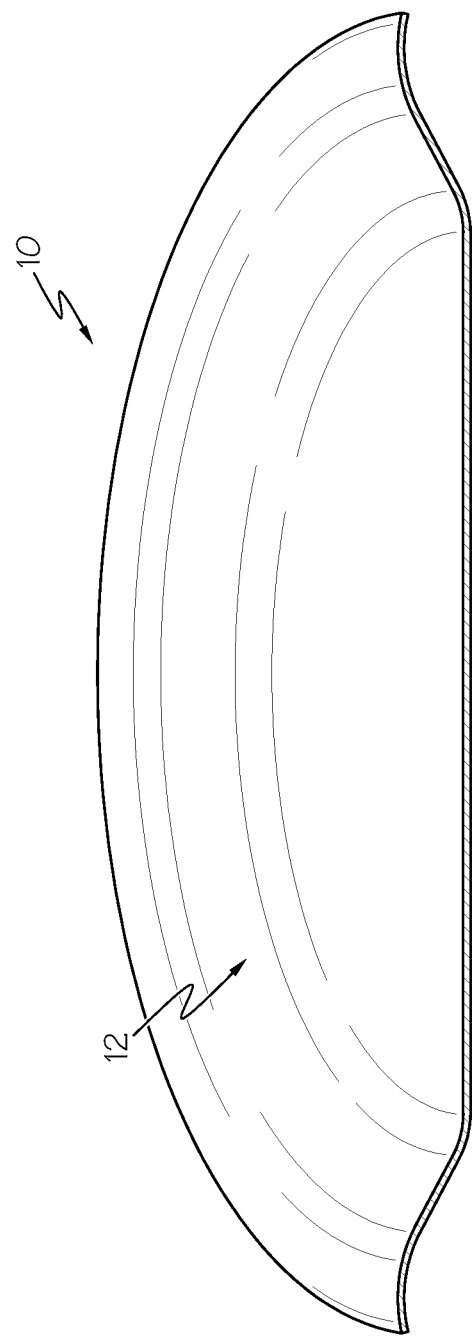
FIG. 1 is a perspective view of a dinnerware article with an energy curable composition in accordance with an embodiment of the invention.

Embodiments of the coating composition and coated product described herein provide many advantages over prior overprint varnish coatings in that the coating is energy curable, and once coated onto a substrate, is thermoformable. The resulting coated and thermoformed substrate exhibits barrier properties, i.e. grease and water resistance. While not wishing to be bound by theory, it is believed that the use of epoxy acrylates containing very flexible polymeric backbones enhances the thermoformability of the coating upon curing such that substrate including the cured coating thereon may be thermoformed into food containers, packaging, articles such as plates, cups, bowls and the like without compromising the functional properties of the coating.

Unless otherwise indicated, the disclosure of any ranges in the specification and claims are to be understood as including the range itself and also anything subsumed therein, as well as endpoints.

One preferred energy curable coating composition comprises from about 40 to about 95% by weight of at least one self-photoinitiating epoxy acrylate, from about 1 to about 30% by weight of a diacrylate selected from dipropylene glycol diacrylate, neopentyl glycol diacrylate, silicone diacrylate, or a combination thereof, and from about 1 to about 30% by weight of a triacrylate selected from trimethylolpropane ethoxy triacrylate, trimethylolpropane triacrylate, or a combination thereof.

Suitable self-photoinitiating epoxy acrylates for use in the coating are described in US 2008/0039543, US 2008/0085981, and U.S. Pat. No. 7,317,061, the contents of which are incorporated by reference. Preferred epoxy acrylates include Drewrad® 131 (viscosity of about 200-700 cps), Drewrad® 151 (viscosity of about 100-500 cps), and Drewrad® 1122 (viscosity of about 7,000-12,000 cps).

Drewrad® 131 is a self-photoinitiating epoxy acrylate which contains about 10% of an ester. Drewrad® 151 is a self-photoinitiating epoxy acrylate which contains about 10% of an ester and about 5% of an ethoxylated acrylate. Drewrad® 1122 is a 100% self-photoinitiating epoxy acrylate.

In a preferred embodiment, the self-photoinitiating epoxy acrylate comprises a blend of at least two self-photoinitiating epoxy acrylates, each having differing viscosities. By utilizing self-photoinitiating epoxy acrylates of differing viscosities, the final viscosity of the coating composition can be controlled without losing its reactivity. The components are preferably blended so that the coating composition has a viscosity ranging from about 50 to about 3,000 cps, and more preferably, about 300 to 600 cps.

Suitable dipropylene glycol diacrylates are commercially available from Cytec Industries as DPGDA. Suitable neopentyl glycol diacrylates are commercially available from Sartomer under the trade name SR247. Suitable silicone diacrylates are commercially available from Cytec Industries under the tradename Ebecryl and include Ebecryl 350.

The composition may further include from about 1 to about 5% by weight lauryl acrylate.

Another suitable energy curable coating composition comprises from about 20 to about 40% by weight of an epoxy acrylate comprising from about 85% by weight epoxy acrylate and about 15% by weight trimethylolpropane triacrylate; from 0 to about 50% by weight tripropylene glycol diacrylate, from about 1 to about 30% by weight trimethylolpropane triacrylate, and from about 15 to about 55% by weight trimethylolpropane ethoxy triacrylate.

Suitable epoxy acrylates for use in this composition include Epoxy Acrylate 00-988/15™, commercially available from Rahn and Ebecryl® 3700, commercially available from Cytec.

The diacrylates and triacrylates are commercially available from Rahn under the trademark Miramer.

The composition preferably further comprises from about 3 to about 10% by weight of a photoinitiator. The photoinitiator preferably comprises a difunctional alpha-hydroxy ketone commercially available from Lamberti USA under the trademark Esacure One®.

The coating composition is preferably prepared by adding the components in sequence to a mixing tank under agitation starting with the epoxy acrylate(s), followed by the diacrylate(s), triacrylate(s), and optional photoinitiator. After the addition of all components, the batch is heated to about 50° C. to 55° C. to dissolve any photoinitiators which are present. The coating is then preferably filtered prior to application to a substrate.

The coating may be applied at room temperature to cellulosic, polymer, or metallized substrates. Suitable cellulosic substrates include, but are not limited to, paper, coated or uncoated paperboard such as clay-coated folding carton grade SBS, and uncoated liquid carton grade SBS. Suitable polymeric substrates include, but are not limited to, polypropylene, polyethylene, polyethylene terephthalate, and polylactic acid. Such polymeric substrates may also have metallized coatings thereon. The coating may be applied to one or both sides of the substrate as desired. The coating may also be applied to molded pulp articles. If desired, printed indicia may be provided on the substrate prior to coating such that the coating overlies the indicia.

The coating composition is preferably a 100% solids coating containing no solvents which is applied to the substrate as a liquid. The coating is 100% polymerizable and preferably contains no inert materials or fillers; although it should be appreciated by those skilled in the art that fillers or other inert materials could be added to the coating if desired.

The coating may be applied by flexographic, gravure, offset gravure, screen, or rod coating and is preferably applied at a coating weight of from about 0.1 to about 2.0 lbs/1000 ft$^2$ (about 0.49 to 9.76 g/m$^2$).

After coating, the coated substrate is then exposed to an energy source, preferably a UV lamp or electron beam to cure the coating. The coated substrate is preferably exposed at about 200 to 1000 mJ/cm$^2$ (H-bulb).

After the coating has been cured, the coated substrate may be cut into the desired size by, for example, a die-cutter. The substrate may then be thermoformed using conventional thermoforming techniques into the desired shape. For example, in forming an article such as a paper plate, a thermoforming machine or press may be used at a temperature of about 350° F. (177° C.) and a pressure of form about 1 to 2 tons (95.8 to 192 Pa). The combination of heat and pressure deforms the fibers of the paperboard into the desired shape, e.g., a plate, tray, etc. Draw ratios of greater than 1 are possible.

Figure 2:
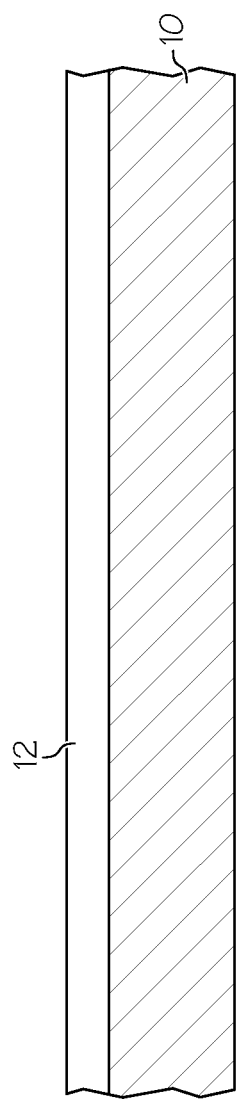
FIG. 2 is a cross-sectional view of the article of FIG. 1.

Referring now to FIG. 1, a substrate 10 thermoformed into a dinnerware article (plate) is shown which includes a coating 12 on its surface in accordance with an embodiment of the invention. The plate may be made using either conventional cellulosic, polymeric, or polymeric metallized substrate materials. While a plate is shown, it will be apparent that other articles such as cups, trays, bowls, and the like are contemplated as well as food packaging and containers for storing food. FIG. 2 illustrates a cross-sectional view of the plate of FIG. 1 including the coating 12 on the surface of the substrate 10. The coating on the substrate provides desirable functional properties such as food release, and is an effective barrier to grease and oils, moisture, and inks.

In order that the invention may be more readily understood, reference is made to the following examples which are intended to illustrate the invention, but not limit the scope thereof.

Example 1

Coating compositions were prepared in accordance with an embodiment of the invention using the following components: epoxy acrylate (00-988/15™), trimethylolpropane triacrylate (TMPTA), tripropylene glycol diacrylate (TPGDA), trimethylolpropane ethoxy triacrylate (TMPEOTA), and a photoinitiator (Esacure One®). The amounts of components in the formulations are set forth below in Table 1. All amounts are reported as weight percentages.

TABLE 1

| Component | Sample 1 | Sample 2 |
|---|---|---|
| epoxy acrylate | 32.5 | 32.5 |
| TMPTA | 15 | 9 |
| TPGDA | 0 | 8 |
| TMPEOTA | 46 | 44 |
| photoinitiator | 6.5 | 6.5 |

All formulations were prepared by adding the components to a mixing vessel, mixing with a mechanical stirrer, and heating the mixture to about 55° C. for about 3 hours to dissolve the photoinitiator. The formulas were then cooled down to ambient temperature and filtered with a 300 micron filter.

The liquid formulas were then applied at room temperature onto a paperboard substrate using an offset gravure coater with a 165 Anilox applicator. The coated boards were then passed through two rows of 600 watts/inch H-bulbs at a dosage of about 400 to 500 mJ/cm² to cure the liquid coating. The samples were cured at a web speed of either 200 or 300 feet per minute (fpm) (61 to 91 meters/min.).

The UV coated samples were then subjected to extractables testing. Sections of board sample measuring 10 cm×15 cm were cut and placed into custom stainless steel extraction cells designed according to FDA specifications for food contact migration testing. The cell was composed of two stainless steel plates sandwiching a Teflon gasket assembly. The gasket isolated only the coated surface for extraction and contained a cavity to hold the extracting solvent. The surface area of board exposed for extraction within the cavity was 51 cm² and 80 ml of 95% ethyl alcohol (ETON) was used as the extraction solvent. Therefore, the solvent volume surface area ratio was 1.57 ml/cm². The samples were extracted per FDA Condition of Use C (66° C./120 minutes, then 10 days at 40° C.) and FDA Condition of use E (10 days at 40° C.) as defined in 21 CFR 176.170(c).

The data for the direct coated surface extractables of the board samples under Condition of Use C is shown in Table 2, and the data for the board samples under Condition of Use E is shown in Table 3.

TABLE 2

95% EtOH Condition of Use C Extractables (μg/in²)

| Sample | Total | Esacure One® | TPGDA | TMPTA | TMPEOTA | All Other |
|---|---|---|---|---|---|---|
| 1-200 fpm | 3.63 | 2.67 | 0.1 | 0.01 | 0.75 | 0.1 |
|  | 3.59 | 2.63 | 0.11 | 0.02 | 0.74 | 0.09 |
| Average | 3.61 | 2.65 | 0.11 | 0.02 | 0.75 | 0.1 |
| 1-300 fpm | 3.9 | 2.95 | 0.11 | 0.02 | 0.73 | 0.09 |
|  | 3.59 | 2.69 | 0.1 | 0.02 | 0.66 | 0.12 |
| Average | 3.75 | 2.82 | 0.11 | 0.02 | 0.7 | 0.11 |
| 2-200 fpm | 3.44 | 2.43 | 0.22 | 0.02 | 0.71 | 0.06 |
|  | 3.43 | 2.49 | 0.2 | 0.02 | 0.61 | 0.11 |
| Average | 3.44 | 2.46 | 0.21 | 0.02 | 0.66 | 0.09 |

TABLE 3

95% EtOH Condition of Use E Extractables (μg/in²)

| Sample | Total | Esacure One® | TPGDA | TMPTA | TMPEOTA | All Other |
|---|---|---|---|---|---|---|
| 1-200 fpm | 2.95 | 2.17 | 0.08 | 0.02 | 0.61 | 0.07 |
|  | 2.54 | 1.9 | 0.08 | 0.01 | 0.51 | 0.04 |
| Average | 2.75 | 2.04 | 0.08 | 0.02 | 0.56 | 0.06 |
| 1-300 fpm | 3.13 | 2.34 | 0.06 | 0.03 | 0.63 | 0.07 |
|  | 2.98 | 2.19 | 0.07 | 0.02 | 0.61 | 0.09 |
| Average | 3.06 | 2.27 | 0.07 | 0.03 | 0.62 | 0.08 |
| 2-200 fpm | 3.03 | 2.17 | 0.14 | 0.03 | 0.63 | 0.06 |
|  | 2.91 | 2.05 | 0.15 | 0.02 | 0.65 | 0.04 |
| Average | 2.97 | 2.11 | 0.15 | 0.03 | 0.64 | 0.05 |

FCN 772 specifies a maximum migration limit of 10 μg/in² for each of the individual components of the coating as well as for "all other" components. As can be seen, all of the coated board samples are compliant with FCN 772 as all the individual migration limits and that of "all other" components are lower than 10 μg/in².

Example 2

Additional coating compositions were prepared as in Example 1. The amounts of components in the formulations are set forth below in Table 4. All amounts are reported as weight percentages.

TABLE 4

| Component | Sample 3 | Sample 4 |
|---|---|---|
| epoxy acrylate | 26.5 | 31 |
| TMPTA | 11.25 | 0 |
| TPGDA | 9.5 | 31.25 |
| TMPEOTA | 46.25 | 31.25 |
| photoinitiator | 6.5 | 6.5 |

The liquid formulas were applied at room temperature onto a paperboard substrate using an offset gravure coater with a 280 Anilox applicator. "White" samples were obtained by applying the UV coatings on plain white paperboard, and "black" samples were prepared by applying the coatings to the same paperboard which was pre-printed with a black ink.

The coated boards were then passed through two rows of 600 watts/inch H-bulbs at a dosage of about 400 to 500 mJ/cm² to cure the liquid coating.

The UV coated samples were then subjected to extractables testing as described in Example 1. The samples were extracted per FDA Condition of Use C (66° C./120 minutes, then 10 days at 40° C.) and FDA Condition of use E (10 days at 40° C.) as defined in 21 CFR 176.170(c).

The data for the direct coated surface extractables of the board samples under Condition of Use E is shown in Table 5, and the data for the board samples under Condition of Use C is shown in Table 6. The samples were cured at a web speed of 200 feet per minute (fpm).

TABLE 5

95% EtOH Condition of Use E Extractables (μg/in²)

| Sample | Total | Esacure One® | TPGDA | TMPTA | TMPEOTA | All Other |
|---|---|---|---|---|---|---|
| 3 - white | 9.01 | 3.14 | 1.18 | 0.91 | 2.55 | 1.24 |
|  | 9.43 | 3.23 | 1.34 | 0.99 | 2.76 | 1.12 |
| Average | 9.22 | 3.19 | 1.26 | 0.95 | 2.66 | 1.18 |
| 4 - white | 14.1 | 4.0 | 6.0 | 0.36 | 2.34 | 1.39 |
|  | 13.59 | 3.84 | 5.44 | 0.36 | 2.41 | 1.53 |
| Average | 13.85 | 3.92 | 5.72 | 0.36 | 2.38 | 1.46 |
| 3 - black | 10.81 | 3.08 | 1.36 | 1.39 | 4.0 | 1.0 |
|  | 10.05 | 3.17 | 1.71 | 1.36 | 3.19 | 0.61 |
| Average | 10.43 | 3.13 | 1.54 | 1.38 | 3.6 | 0.81 |
| 4 - black | 16.14 | 3.08 | 8.69 | 0.61 | 2.61 | 1.15 |
|  | 16.42 | 4.23 | 7.61 | 0.51 | 3.01 | 1.05 |
| Average | 16.28 | 3.66 | 8.15 | 0.56 | 2.81 | 1.1 |

TABLE 6

95% EtOH Condition of Use C Extractables (μg/in²)

| Sample | Total | Esacure One® | TPGDA | TMPTA | TMPEOTA | All Other |
|---|---|---|---|---|---|---|
| 3 - white | 9.68 | 4.51 | 1.14 | 0.88 | 2.54 | 0.63 |
|  | 9.93 | 4.58 | 1.18 | 1.0 | 2.51 | 0.68 |
| Average | 9.81 | 4.55 | 1.16 | 0.94 | 2.53 | 0.66 |
| 4 - white | 12.62 | 4.69 | 4.63 | 0.29 | 2.11 | 0.92 |
|  | 13.72 | 5.37 | 4.91 | 0.33 | 2.17 | 0.95 |
| Average | 13.17 | 5.03 | 4.77 | 0.31 | 2.14 | 0.94 |
| 3 - black | 10.23 | 2.66 | 1.17 | 1.06 | 4.92 | 0.4 |
|  | 9.91 | 2.77 | 1.27 | 1.04 | 4.44 | 0.38 |
| Average | 10.07 | 2.72 | 1.22 | 1.05 | 4.68 | 0.39 |
| 4- black | 15.95 | 3.0 | 8.53 | 0.59 | 2.66 | 1.15 |
|  | 16.43 | 4.17 | 7.85 | 0.53 | 2.59 | 1.29 |
| Average | 16.19 | 3.59 | 8.19 | 0.56 | 2.63 | 1.22 |

All of the coated board samples are compliant with FCN 772 as all of the individual migration limits and that of all other components are lower than 10 μg/in².

Example 3

The 3-white, 4-white, 3-black and 4-black coated board samples prepared in Example 2 were thermoformed into 9-inch diameter plates on a production paper plate forming press at a press temperature of about 350° F. and 1 to 2 tons pressure. The press speed was about 40 fpm.

The resulting coated paper plates were then subjected to performance testing. The 60° gloss was measured with a Gardner Micro Tri-Gloss meter. Hot water resistance was measured by placing 100 ml of 160° F. tap water on the plates for 30 minutes, and the weight % of water pick-up by the plates was recorded. Hot oil resistance was measured by placing 50 ml of 160° F. corn oil onto the plates for 20 minutes. A green dye stain test was performed by placing a water-based green dye solution on the plates for 15 seconds and observing any pinholes on the plates. The hot egg test consisting of placing a hot hard-boiled egg with the shell removed onto the plates for 60 minutes and observing any ink transfer from the paper plates to the egg. The results are summarized in Table 7 below.

TABLE 7

| Test conditions | Sample 3-white | Sample 4-white | Sample 3-black | Sample 4-black |
|---|---|---|---|---|
| 60° Gloss | 86 | 88 | 53 | 76 |
| Hot water resistance | 6% | 7% | 20% | 18% |
| Hot oil resistance | No bleeding through plate base | No bleeding through plate base | No bleeding through plate base | No bleeding through plate base |
| Green dye stain | No pinholes in plate base | No pinholes in plate base | No pinholes in plate base | No pinholes in plate base |
| Hot egg test | Not tested | Not tested | No ink transfer | No ink transfer |

Example 4

Coating compositions were prepared in accordance with another embodiment of the invention using the components set forth below in Table 8. All amounts are reported as weight percentages.

TABLE 8

| Component | Sample 5 | Sample 6 |
|---|---|---|
| Drewrad ® 131 | 98.5 | 0 |
| Drewrad ® 151 | 0 | 78.8 |
| Drewrad ® 1122 | 0 | 19.7 |
| Silicone diacrylate (Ebecryl ® 350) | 1.5 | 1.5 |

All formulations were prepared by adding the components to a mixing vessel and mixing with a mechanical stirrer at room temperature for 1 hour to dissolve the components. The formulas were then filtered with a 300 micron filter.

The liquid formulas were then applied at room temperature onto a 17-point clay-coated SBS (solid bleached sulfate) paperboard which had been pre-printed with a water-based ink using a 700 Anilox applicator. The coated boards were then passed through a 600 watt/inch H-bulb at a dosage of about 400 mJ/cm² to cure the liquid coatings. The web speed was about 70 fpm.

The UV coated boards were then thermoformed into 9-inch diameter plates on a production paper plate forming press at a press temperature of about 350° F. and 1 to 2 tons pressure. The press speed was about 40 fpm.

The UV coated paper plates were then subjected to performance testing as described above with regard to Example 3. The results are shown below in Table 9.

TABLE 9

| Test conditions | Sample 5 | Sample 6 |
|---|---|---|
| 60° Gloss | 92 | 83 |
| Hot water resistance | 2.9% | 3.3% |
| Hot oil resistance | No oil bleed through | No oil bleed through |
| Green dye stain | Very slight stain | Slight stain |
| Hot egg test | No ink transfer | No ink transfer |

Having described the invention in detail and by reference to preferred embodiments thereof, it will be apparent that modifications and variations are possible without departing from the scope of the invention.

What is claimed is:

1. An energy curable coating composition for use on substrates comprising a mixture of:
   a) from about 20 to about 40% by weight of an epoxy acrylate comprising about 85% by weight epoxy acrylate and about 15% by weight trimethylolpropane triacrylate;
   b) from about 0 to about 50% by weight tripropylene glycol diacrylate,
   c) from about 1 to about 30% by weight trimethylolpropane triacrylate; and
   d) from about 20 to about 55% by weight trimethylolpropane ethoxy triacrylate, wherein said coating composition, after coating on a substrate and curing, is thermoformable and exhibits barrier properties, and exhibits a food contact migration level of less than 10 µg/in.².

2. The energy curable coating composition of claim 1 further comprising a photoinitiator.

3. The energy curable coating composition of claim 1 wherein said coating has a viscosity of from about 50 to about 3,000 cps.

4. The energy curable coating composition of claim 1 wherein said coating contains no solvents or carriers.

5. The energy curable coating composition of claim 1 wherein said composition further comprises from about 3 to about 10% by weight of a photoinitiator.

6. The energy curable composition of claim 1 wherein said composition comprises from about 1 to about 40% by weight tripropylene glycol diacrylate.

7. A method of forming a food package or article having an energy curable coating composition thereon comprising:
   providing a substrate having first and second major surfaces;
   applying an energy curable coating composition to at least one of said first and second major surfaces of said substrate; said coating comprising a) from about 20% to about 40% by weight of an epoxy acrylate comprising about 85% by weight of an epoxy acrylate and about 15% by weight trimethylolpropane triacrylate; b) from 0 to about 50% tripropylene glycol diacrylate; c) from about 1% to about 30% by weight trimethylolpropane triacrylate; and d) from about 20 to about 55% by weight trimethylolpropane ethoxy triacrylate;

exposing said coating composition to radiation sufficient to cure said coating composition and form a coated substrate; and thermoforming said coated substrate into a shaped food package or article, wherein said thermoformed package or article exhibits barrier properties and exhibits a food contact migration level of less than 10 μg/in.$^2$.

8. The method of claim 7 wherein said radiation comprises UV or electron beam radiation.

9. The method of claim 7 wherein said coating composition is applied as a 100% solids coating.

10. The method of claim 7 wherein said coating composition is applied by screen printing, gravure, offset gravure, flexographic, or rod coating.

11. A coated and thermoformed package or article comprising a substrate having first and second major surfaces, with at least one of said major surfaces having coated thereon a cured coating which exhibits a food contact migration level of less than 10 μg/in.$^2$, said coating comprising a) from about 20% to about 40% by weight of an epoxy acrylate comprising about 85% by weight epoxy acrylate and about 15% by weight trimethylolpropane triacrylate; b) from 0 to 50% by weight tripropylene glycol diacrylate; c) from about 1 to about 30% by weight trimethylolpropane triacrylate; and d) from about 20 to about 55% by weight trimethylolpropane ethoxy triacrylate.

12. The coated package or article of claim 11 wherein said cured coating has a coat weight of about 0.1 to about 2.0 lbs/1000 ft$^2$.

13. The coated package or article of claim 11 wherein said coated substrate includes printed indicia on said substrate and underlying said coating.

14. The coated package or article of claim 11 wherein said substrate comprises a cellulosic, polymeric, or metallized substrate.

15. The coated package or article of claim 14 wherein said cellulosic substrate comprises paper, coated paper board, uncoated paper board or molded pulp.

16. The coated package or article of claim 14 wherein said polymeric substrate comprises polypropylene, polyethylene, polyethylene terephthalate, and polylactic acid.

* * * * *